(12) United States Patent
Lowe et al.

(10) Patent No.: US 9,074,326 B2
(45) Date of Patent: Jul. 7, 2015

(54) HINGED RAIL SEAL CLIP

(75) Inventors: Tyler R. Lowe, Forest Grove, OR (US); Brit Carroll, Tigard, OR (US)

(73) Assignee: Dacon Industries, Portland, OR (US)

( * ) Notice: Subject to any disclaimer, the term of this patent is extended or adjusted under 35 U.S.C. 154(b) by 375 days.

(21) Appl. No.: 13/486,544

(22) Filed: Jun. 1, 2012

(65) Prior Publication Data
US 2012/0305501 A1 Dec. 6, 2012

Related U.S. Application Data

(60) Provisional application No. 61/492,781, filed on Jun. 2, 2011.

(51) Int. Cl.
*F16B 2/20* (2006.01)
*B23P 11/00* (2006.01)
*E01B 26/00* (2006.01)
*E01C 9/04* (2006.01)
*F16B 2/10* (2006.01)

(52) U.S. Cl.
CPC ........... *E01B 26/00* (2013.01); *Y10T 29/49826* (2015.01); *E01C 9/04* (2013.01); *F16B 2/10* (2013.01)

(58) Field of Classification Search
CPC .............. F16B 2/20; F16B 2/10; B23P 11/00; B60M 5/00; E01C 9/04; E01B 21/00; E01B 9/28; E01B 9/46; E01B 9/32; E01B 9/62; E01B 26/00; E01B 19/003; E01B 29/32; E01B 2204/11
USPC ............ 24/568, 522, 457, 458, 527; 238/310, 238/378, 314, 338, 2, 3, 8; 269/249, 143; 29/276, 257; 70/14, 18, 202, 226; 211/13.1
See application file for complete search history.

(56) References Cited

U.S. PATENT DOCUMENTS

| 6,213,407 | B1 | 4/2001 | Ellis | |
|---|---|---|---|---|
| 6,401,318 | B1 | 6/2002 | Bruyn | |
| 6,701,594 | B2 * | 3/2004 | Bruyn | ............................. 29/257 |
| 6,701,597 | B2 | 3/2004 | Voss et al. | |
| 2009/0178248 | A1 * | 7/2009 | Buta et al. | ........................ 24/568 |
| 2009/0294546 | A1 * | 12/2009 | Bedford | ........................ 238/351 |

* cited by examiner

*Primary Examiner* — Robert J Sandy
*Assistant Examiner* — Rowland Do

(57) ABSTRACT

A rail clip to be used to fasten rail seals or flangeway fillers to a rail. The rail clip includes a generally U-shaped hinged clip with one or more hinges formed by two curved arms of the same or different curvatures and an elongated back. The elongated back is designed to fit between the foot of the rail and the ballast. One or more of the arms may be rotatable such that it is perpendicular to the elongated arm and the other arm, allowing the clip to be put in place. Once the clip is in place, the arm is rotated to the desired position and locked into place, holding each rail seal against the rail.

7 Claims, 3 Drawing Sheets

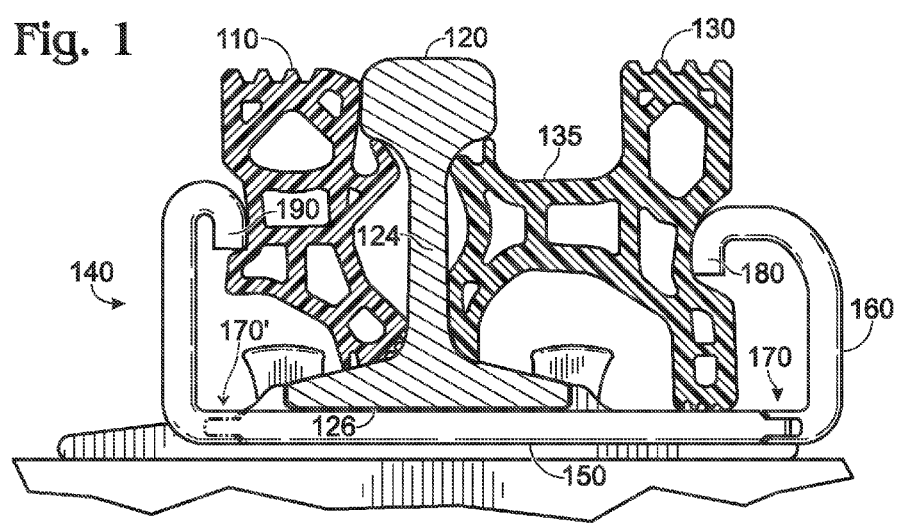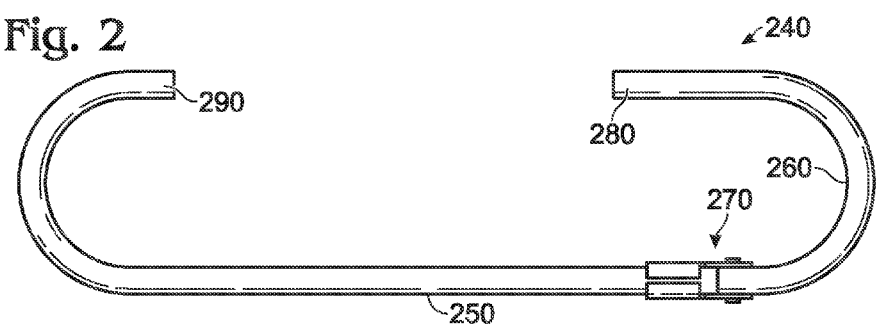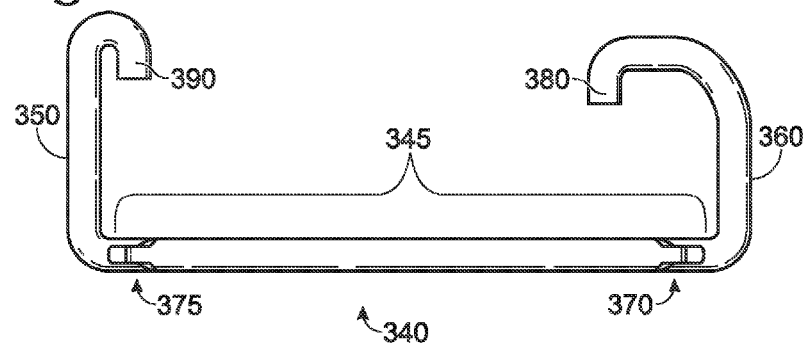

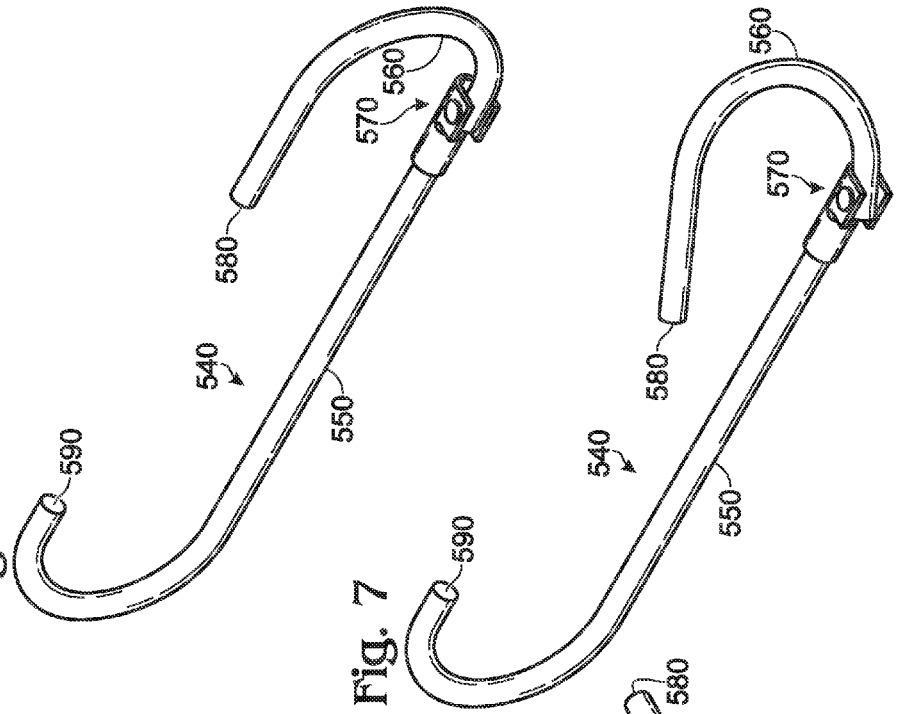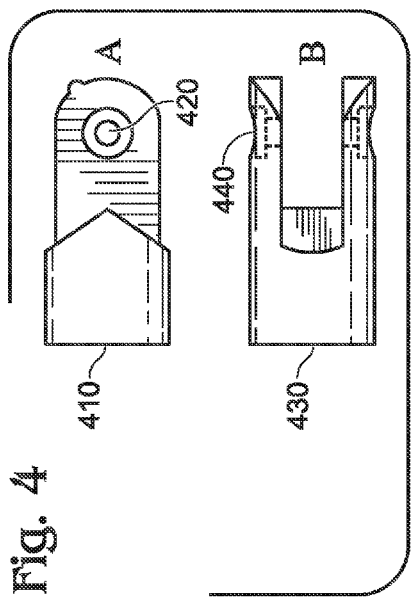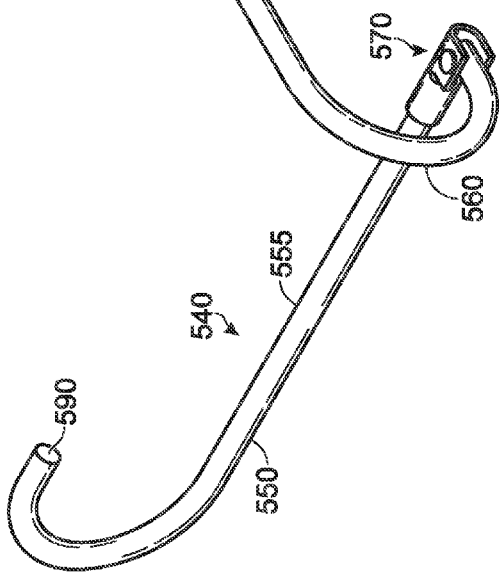

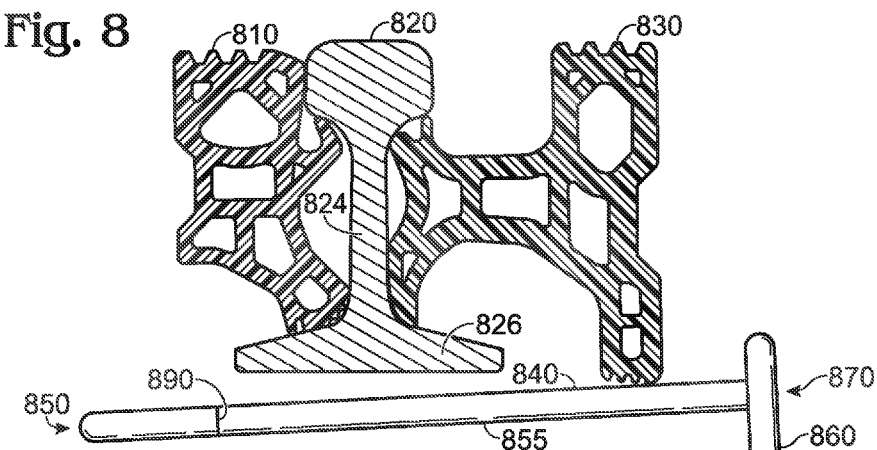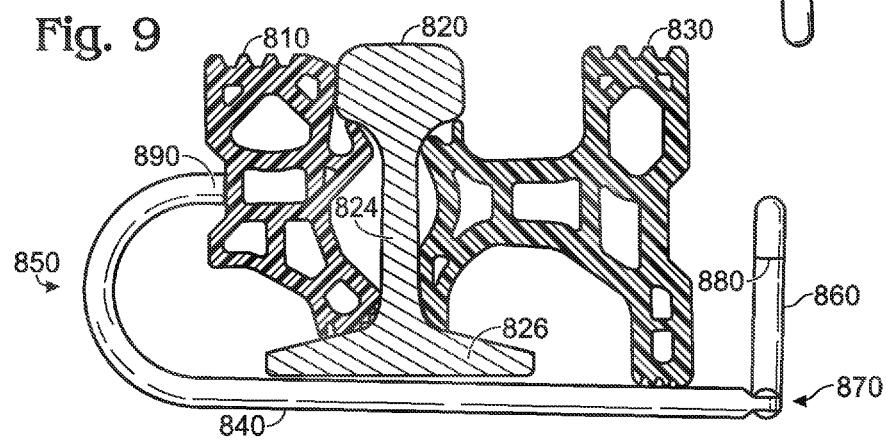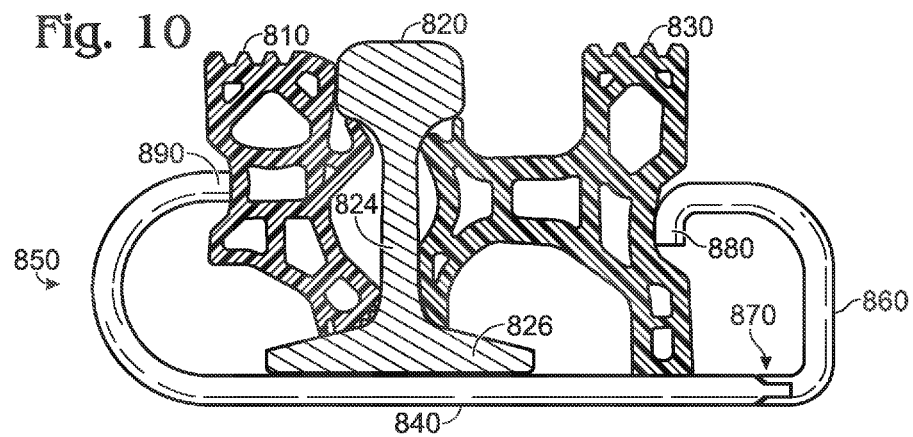

HINGED RAIL SEAL CLIP

CROSS REFERENCE TO RELATED APPLICATIONS

This application claims the benefit of U.S. Provisional Patent Application No. 61/492,781 filed Jun. 2, 2011 which is incorporated herein by reference in its entirety.

FIELD OF THE INVENTION

The present invention relates generally to an apparatus for securing rail seals to a rail. Particularly, the present invention relates to a rail seal clip for use in rail crossings or road level railbeds.

BACKGROUND OF THE INVENTION

Rail crossings are places where roads, footpaths, or other rights of way cross railway tracks. Crossings are a source of ongoing conflict between the needs of the railways and the needs of rail crossing users. Pedestrians, drivers, animals and other users prefer that the crossings be as similar to or as consistent with the road surface as possible. Similarly, in road level railbeds such as those used for light rail, it is desirous to have the railbed and the road form as continuous a surface as possible. However, trains and other rail equipment require a space, called a flangeway gap, between the inner edge of the rail and the crossing surface sufficient to allow the wheels of the train or other rail equipment to pass through. The flangeway gap can cause issues for non-rail users and is also an area where there is frequent accumulation of water and debris, accelerating wear and tear on the crossing and adding to maintenance requirements.

Rail seals such as those described in U.S. Pat. Nos. 4,606,498 and 8,100,342 are designed to fill the flangeway gap while still allowing the train to pass. They fit snugly against the rail on gage and field sides, easing rail crossings and road level railbeds and preventing moisture and debris from filling the gaps between the rail and the crossing material.

In order to function properly, rail seals need to be firmly held against the sides of the rail. Typically, rail seals are held in place using spikes as in U.S. Pat. No. 4,606,498 or rail clips as in U.S. Pat. No. 6,213,407. Bending partially driven spikes to hold the rail seals in place can be dangerous and can damage the cross ties. Traditional spring-clips require special tools to install them correctly. There is therefore a need in the art for rail clips that are easy to install and do not require special tools for installation.

SUMMARY OF THE INVENTION

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments. The summary is directed to rail clips that may be used to hold rail seals or other flangeway fillers in place and methods for installing such rail clips.

The rail clip as described herein is a metal bracket of a generally U-shaped configuration. In one embodiment the rail clip may be formed by joining a J shaped bracket with a reversed C shaped bracket with an elongated arm formed by the back of the J shaped bracket. In another embodiment the rail clip may be formed by joining a reverse J shaped bracket with a C shaped bracket with an elongated arm formed by the back of the J shaped bracket. In some embodiments the C shaped bracket is on the field side of the rail. In other embodiments the J shaped bracket is on the field side of the rail. In additional embodiments the reverse C shaped bracket is on the gage side of the rail. In further embodiments, the reverse J shaped bracket is on the gage side of the rail.

The two brackets are joined by a hinge in a single plane to form the U shaped bracket. The hinge may be any type of hinge that allows the reverse C shaped bracket (or C shaped) and the J shaped (or reverse J shaped) bracket to rotate and/or pivot independently of each other. Each bracket may rotate and/or pivot the same or different amounts from about 0° to about 360°, preferably about 20° to about 180°, from about 30° to about 90°, from about 0° to about 75°, from about 35° to about 75° from about 35° to about 45°, from about 45° to about 90°, from about 90° to about 135° from about 90° to about 125°. In some embodiments, the hinge may allow the reverse C shaped bracket (or C shaped bracket) and the J shaped bracket (or reverse J shaped bracket) to rotate forwards and/or backwards. In other embodiments, the reverse C shaped bracket (or C shaped bracket) and/or the J shaped bracket (or reverse J shaped bracket) may rotate different amounts forward or backwards. In further embodiments, rotating the bracket a particular amount may lock it into place. Each of the reverse C shaped (or C shaped) and J shaped (or reverse J shaped) brackets additionally has a free end that may be used to lock a rail seal into place against a rail.

In another embodiment, the rail clip may be formed by joining two curved brackets with an elongated arm. The brackets may be curved the same or different amounts. The field side bracket is attached to the elongated arm on a first end with a first hinge and the gage side bracket is attached to a second end of the elongated arm with a second hinge. The hinges may be any type of hinge that allows the two curved brackets to rotate and/or pivot independently of each other in relation to the elongated arm and may be the same or different types of hinges. Each bracket may rotate and/or pivot the same or different amounts from about 0° to about 360°, preferably about 20° to about 180°, from about 30° to about 90°, from about 0° to about 75°, from about 35° to about 75°, from about 35° to about 45°, from about 45° to about 90°, about 90° to about 135°, about 90° to about 125°. In some embodiments, the hinges may allow the brackets to move forwards and backwards. In additional embodiments, the hinges may allow the brackets to move different degrees forwards or backwards. In further embodiments, the hinges may allow the brackets to move the same amounts forwards and backwards. In other embodiments, the hinges may lock into place when rotated or pivoted a particular amount. Each curved bracket additionally has a free end that may be used to lock a rail seal into place against a rail.

Generally, when rails are installed, the crossties are set in ballast such as gravel. The ballast is usually set just below the level of the crosstie creating a gap between the undersurface of the foot of the rail and the ballast. To install the rail clips as described herein, the bracket is placed flat against the ground and the elongated arm is manipulated under the foot of the rail in the gap between the foot of the rail and the ballast. In single hinged embodiments, the C or reverse C shaped bracket is rotated so that it is approximately perpendicular to the reverse J or J shaped side of the bracket. In some embodiments, the C or reverse C shaped bracket is rotated prior to manipulating the elongated arm under the foot of the rail. The entire clip is then rotated upright so that the free end of the J shaped or reverse J shaped bracket presses against the rail seal on the appropriate side, holding it in place. The C or reverse C shaped bracket is then rotated past the plane of the reverse J shaped or J shaped bracket to lock in place and clamp the rail seal against the rail. For example, in an instance in which the reverse C shaped bracket is on the gage side of the rail, the bracket is placed flat against the ground. The reverse C shaped bracket is rotated so that it is approximately perpendicular to the J shaped bracket. The elongated back of the J shaped bracket is then manipulated under the foot of the rail. The entire clip is then rotated upright so that the free end of the J shaped bracket on the field side of the rail presses against the field side rail seal. The reverse C shaped bracket is then rotated past the plane of the field side of the bracket to lock into place and clamp the gage side rail seal against the gage side of the rail.

In multi-hinged embodiments, either or both of the curved arms may be rotated approximately perpendicularly to the elongated arm prior to or after manipulation under the foot of the rail. The entire clip is then rotated upright and the rotated arms are rotated back past the plane of the elongated arm to lock in place and clamp the rail seals against the respective sides of the rail. The rail clips as described herein can be installed with minimum labor and disruption of ballast and do not require any special tools.

Other objects, features and advantages of the present invention will be apparent from the following specification and drawings.

BRIEF DESCRIPTION OF THE DRAWINGS

FIG. 1 is a cross section view of a rail and rail seals secured by means of an embodiment of the invention.

FIG. 2 is a side view of an embodiment of the invention.

FIG. 3 is a side view of an embodiment of the invention.

FIGS. 4 A-B are top views A and side views B of the hinge portion of an embodiment of the invention.

FIG. 5 is a view of a rail seal clip of an embodiment of the invention.

FIG. 6 is a view of a rail seal clip of an embodiment of the invention.

FIG. 7 is a view of a rail seal clip of an embodiment of the invention.

FIG. 8 is a top view of an embodiment of the invention placed under a rail.

FIG. 9 is a side view of an embodiment of the invention rotated into an upright position.

FIG. 10 is a cross-sectional view of a rail and a pair of rail seals secured by an embodiment of the invention.

DETAILED DESCRIPTION

Referring now to the drawings, FIG. 1 depicts one rail 120 of a pair of rails (second rail not shown) conventionally mounted on a chair mounted on a cross-tie and held in place with railway spikes. A first rail seal 110 is held against the field side of the web 124 of a rail 120 and a second rail seal 130 is held against a second side of the web 124 on the gage side of the rail 120 by means of an exemplary rail clip 140. The second rail seal 130 includes a recess 135 to accommodate the flanges of passing railway wheels (flangeway gap). The rail clip 140 passes underneath the foot 126 of the rail 120. The other rail in a set of rails would be the mirror image of FIG. 1 with the second rail seal 130 on the gage side and the first rail seal 110 on the field side of the rail 120. In a typical crossing or road level rail bed, multiple rail clips 140 would be used to ensure that the rail seals were held in place along the length of the rail in the crossing or road.

For ease of description, the rail clip is described in terms of the field side of the rail being on the left as one looks down the length of the rail and the gage side of the rail being on the right as shown in FIG. 1. This configuration would be reversed in the second rail of a pair of rails with the field side being on the right as one looks down the length of the rail and the gage side being on the right (not shown).

The rail clip 140 comprises a J shaped bracket 150 (field side) and a reverse C shaped bracket 160 (gage side) which are connected by a hinge 170. The hinge 170 may be any type of hinge generally used to connect brackets such that it allows the brackets to rotate or pivot independently of one another. In alternate embodiments, the rail clip 140 is the reverse, with a C shaped bracket on the field side and a reverse J shaped bracket on the gage side connected by a hinge 170'.

In some embodiments, each bracket may rotate up to about 360° or any fraction thereof as seen in a universal joint, universal coupling, U joint, Cardan joint, Hardy-Spicer joint, or Hooke's joint in relation to the other end. Exemplary hinges additionally include a gate hinge which may pivot from about 90° to about 180°. In other embodiments, the rotation may be about 45° to about 180°, about 45° to about 95°, about 45° to about 90°, about 90° to about 135°, about 90° to about 125° in relation to the various axes. In some embodiments the hinge may allow the brackets or a bracket to move forward or backward. In other embodiments the hinge may allow the brackets to move more in one direction than the other. For example, the hinge may allow the bracket to move about 90° forwards, towards an installer and then back about 125°, i.e. about 35° past its uniplanar starting position to lock in place. In other embodiments, the hinge may allow the bracket to move about 90° backwards, so that the end of the bracket 180 is facing the installer and then forwards about 125°, i.e. about 35° past its uniplanar starting position to lock in place. In some embodiments, the hinge may be secured. The hinge 170 or 170' may be spring loaded, secured with a locking sleeve, screw or other fastening device known to those of skill in the art. In other embodiments it may snap in place. In further embodiments, it may lock in place when a particular rotation is achieved. In some embodiments, the rotation of different parts of the device may be in one or more planes. In other embodiments, the J end and the C end of the rail clip rotate and/or pivot so that they are perpendicular to each other. In additional embodiments, each end of the hinge may rotate and/or pivot independently and in varying degrees in comparison to the other. For example, the C end of the rail clip may rotate about 135° to about 85°, about 125° to about 90°, about 95° to about 80°, preferably about 90° whereas the J end of the bracket may rotate about 45° or less, about 40° to about 35°, about 40° to about 30° from a uniplanar position or vice versa. In some embodiments, the J end of the rail clip may rotate about 35°. As shown in FIG. 1, the respective free ends 190 and 180 of the J bracket and reverse C bracket of the rail clip 140 may be curved. In other embodiments they may be straight. In some embodiments, one or the other may independently be straight or curved. The ends 190 and 180 may be curved the same amount or different amounts as shown in FIG. 1. Rail seals may be secured to a rail using one or more rail clips 140 along the length of the rail 120 as necessary. After the rail clips 140 are installed, the rest of the rail crossing structure may be constructed in the typical fashion.

Referring to FIG. 2, the rail clip is described in terms of the field side of the rail being on the left as one looks down the length of the rail and the gage side of the rail being on the right for ease of description. This configuration would be reversed in the second rail of a pair of rails with the field side being on the right as one looks down the length of the rail and the gage side being on the right (not shown).

The rail clip 240 comprises a J shaped bracket 250 (field side) and a reverse C shaped bracket 260 (gage side) which are connected by a hinge 270. In alternate embodiments, the hinge 270 may be on the left side of the image (not shown) such that the rail clip 240 comprises a C shaped bracket connected to a reverse J shaped bracket. The hinge 270 may be any type of hinge generally used to connect brackets such that it allows the brackets to rotate independently of one another. In some embodiments, each end may rotate up to about 360° or any fraction thereof as seen in a universal joint, universal coupling, U joint, Cardan joint, Hardy-Spicer joint, or Hooke's joint in relation to the other end. Exemplary hinges additionally include a gate hinge which may pivot from about 90° to about 180°. In other embodiments, the rotation may be about 45° to about 180°, about 45° to about 95°, about 45° to about 90°, about 90° to about 135°, about 90° to about 125°, in relation to the various axes. In some embodiments the hinge may allow the brackets or a bracket to move forward or backward. In other embodiments the hinge may allow the brackets to move more in one direction than the other. For example, the hinge may allow the bracket to move about 90° forwards, towards an installer, and then back about 125°, i.e. 35° past its uniplanar starting position to lock in place. In other embodiments, the hinge may allow a bracket to move about 90° backwards, away from an installer and then forward about 125°, i.e. about 35° past its uniplanar starting position to lock in place. The hinge 270 may be spring loaded, secured with a locking sleeve, screw or other fastening device known to those of skill in the art. In other embodiments it may snap in place. In further embodiments, it may lock in place when a particular rotation is achieved. In some embodiments, the rotation of different parts of the device may be in one or more planes. In other embodiments, the J end and the C end of the rail clip rotate and/or pivot so that they are perpendicular to each other. In some embodiments, the C end of the rail clip rotates about 90° from the J end of the rail clip for installation and then rotates back about 10°, about 15°, about 20°, about 25°, about 40°, about 45°, about 50°, about 60°, about 95°, about 100°, about 105°, about 110°, about 115°, about 120°, about 125°, about 130°, about 125°, about 135°, about 140°, about 145°, to lock into place, holding a rail seal against a rail. As shown in FIG. 2, the respective free ends 290 and 280 of the J bracket and reverse C bracket of the rail clip 240 may be curved. In other embodiments they may be straight. In some embodiments, one or the other may independently be straight or curved. The ends 290 and 280 may be curved different amounts or the same amount as shown in FIG. 2.

Referring now to FIG. 3, a multi-hinged embodiment of a rail clip is shown in which the field side of the bracket is on the left and the gage side of the bracket is on the right. In a second rail (not shown), the configuration would be reversed with the gage side of the clip on the left and the field side of the clip on the right. For convenience, the rail clip is described as shown in FIG. 3 but the mirror image would also apply.

In this embodiment, the rail clip 340 comprises two curved brackets 350 and 360 attached by hinges 375 and 370 to an elongated arm 345. The field side curved bracket 350 is joined by a first hinge 375 to a first end of the elongated arm and a gage side curved bracket 360 is joined by second hinge 370 to a second end of the elongated arm such that the field side curved bracket 350 and the gage side curved bracket 360 can rotate independently of one another in relation to the elongated arm.

The two curved brackets 350 and 360 have free ends 390 and 380 respectively which may be curved as shown or straight. In some embodiments, either bracket end may independently be curved or straight. The two curved arms 350 and 360 may be the same or different lengths and have the same or different degrees of curvature. Either or both of the curved arms 350 and 360 may rotate through the hinge 375 and 370 respectively. The hinges 375 and 370 may be any type of hinge generally used to connect brackets such that it allows the brackets to rotate and/or pivot independently of one another in relation to the elongated arm. In some embodiments the hinges may be the same type of hinge. In other embodiments each hinge may be a different type of hinge. In some embodiments, each curved bracket 350 and 360 may rotate up to about 360° as seen in a universal joint, universal coupling, U joint, Cardan joint, Hardy-Spicer joint, or Hooke's joint in relation to the other end. In other embodiments, the rotation may be about 30° to about 180°, 35° to about 95°, about 35° to about 90°, about 35° to about 75°, about 90° to about 135° in relation to the various axes. In some embodiments the hinge may allow the brackets or a bracket to move forward or backward. In other embodiments the hinge may allow the brackets to move more in one direction than the other. For example, the hinge may allow the bracket to move about 90° forwards, towards an installer and then back about 125°, i.e. about 35° past its uniplanar starting position to lock in place. In other embodiments, the hinge may allow the bracket to move about 90° backwards, so that the end of the bracket 380 is facing the installer and then forwards about 125°, i.e. about 35° past its uniplanar starting position to lock in place. Exemplary hinges additionally include a gate hinge which may pivot from about 90° to about 180°. The hinge 370 may be spring loaded, secured with a locking sleeve, screw or other fastening device known to those of skill in the art. In other embodiments it may snap in place. In further embodiments, it may lock in place when a particular rotation and/or pivot is achieved or any other locking mechanism that is generally used to secure a hinge.

In some embodiments, the rotation of different parts of the device may be in one or more planes. In other embodiments, one or both of the curved brackets may rotate perpendicular to the elongated arm 340. In additional embodiments, each end of the hinge may rotate independently and in varying degrees in comparison to the other. For example, the gage side end of the rail clip may rotate from about 0° to about 360°, from about 180° to about 85°, from about 180° to about 95°, from about 180° to about 80°, preferably from about 180° to about 90°, more preferably from about 180° to about 75° whereas the field side end of the bracket may rotate about 45° or less, about 40° to about 35°, about 40° to about 30° or vice versa.

An embodiment of a hinge that may be used in embodiments of the invention is shown in FIG. 4. The hinge comprises a pin (not shown) and two halves, a male half 410 and a female half 430. When assembled, a pin (not shown) is inserted in a hole 440 in the female half 430 and through the hole 420 in the male half 410, connecting the two pieces of the hinge.

Referring now to FIGS. 5, 6, and 7, the rotation of the parts of an exemplary rail clip as disclosed herein is depicted. A side view of an embodiment of a rail clip 540 with the field side of the bracket on the left and the gage side of the bracket on the right as described herein is shown in FIG. 5. For convenience, the rail clip is described as shown in FIG. 5 with the field side on the left and the gage side on the right, but the mirror image (not shown) would apply to the second rail with the gage side of the bracket on the left and the field side of the bracket on the right. The rail clip 540 shown in FIG. 5 comprises a J shaped bracket 550 connected to a reverse C shaped bracket 560 by a hinge 570. The reverse C shaped bracket 560 is rotated forwards about 90° as shown in FIG. 6 and the rail clip 540 is maneuvered under a rail (not shown) so that the long arm of the J shaped bracket 555 is perpendicular to the rail. The end 590 of the J shaped bracket is then positioned to hold a rail seal in place. The reverse C shaped bracket 560 is then rotated more than 90°, about 95°, about 100°, about 105°, about 110°, about 115°, about 120°, about 125°, about 130°, about 135°, about 140°, about 145°, back past its starting position in FIG. 5 so that the end 580 holds a rail seal against a rail and the reverse C shaped bracket locks in place as shown in FIG. 7.

Referring to FIGS. 8, 9, and 10, a method installing a rail clip as disclosed herein is depicted. A top view of an embodiment of a rail clip 840 with the field side of the bracket on the left and the gage side of the bracket on the right is shown in FIG. 8 along with an end view of a rail. Any of the rail clips as described above may be installed using these methods. For convenience, the rail clip is described as shown in FIG. 8 but the mirror image would apply to the second rail. The rail clip 840 shown in FIG. 8 comprises a J shaped bracket 850 connected to a reverse C shaped bracket 860 by a hinge 870. As shown in FIG. 8, the reverse C shaped bracket 860 is rotated forwards about 90° towards an installer and the rail clip 840 is maneuvered under the foot 826 of a rail 820 so that the long arm 855 of the J shaped bracket 850 is perpendicular to a rail. The rail clip 840 is then rotated upwards so that the end 890 of the J shaped bracket may be positioned to hold a rail seal 810 in place against the web 824 of a rail 820 as shown in FIG. 9. The reverse C shaped bracket 860 is then rotated more than 90°, about 95°, about 100°, about 105°, about 110°, about 115°, about 120°, about 125°, about 130°, about 135°, about 140°, about 145°, past its starting position to lock into place, holding a second rail seal 830 against a rail 820 as shown in FIG. 10.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a railway via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While a preferred embodiment of the present invention has been illustrated, those skilled in the art will recognize that many modifications and variations are possible in accordance with the above teachings without varying from the spirit and scope of the invention. It is to be understood that such modifications and variations are within the spirit and scope of the present invention as set forth in the following claims.

We claim:

1. A rail clip for securing first and second rail seals on opposite sides of a rail,
   wherein the rail clip is of a U shaped configuration, the U shaped rail clip comprising:
      a J shaped bracket with an elongated back;
      a reverse C shaped bracket;
      wherein the reverse C shaped bracket is joined to an end of the elongated back of the J shaped bracket by a hinge such that the reverse C shaped bracket and the J shaped bracket are in the same plane; and
      wherein the reverse C shaped bracket can pivot forward on the hinge to be out of plane with the J shaped bracket; and
      wherein pivoting the C shaped bracket back past the plane of the J shaped bracket locks the hinge in place.

2. The rail clip of claim 1, wherein the reverse C shaped bracket can rotate more than about 90° from the J shaped bracket.

3. The rail clip of claim 1, wherein the reverse C shaped bracket can rotate 125°.

4. The rail clip of claim 1, wherein the reverse C shaped bracket can rotate forward and backward from a uniplanar position.

5. The rail clip of claim 1, wherein the reverse C shaped bracket can rotate about 90° forward from a uniplanar position.

6. The rail clip of claim 1, wherein the reverse C shaped bracket can rotate about 35° backward from a uniplanar position.

7. The rail clip of claim 6, wherein rotating the reverse C shaped bracket backward locks the bracket into place such that it holds the second rail seal firmly against the rail.

\* \* \* \* \*